June 3, 1930.  J. O. ALMEN ET AL  1,761,957
STEERING ARM
Filed Oct. 2, 1929
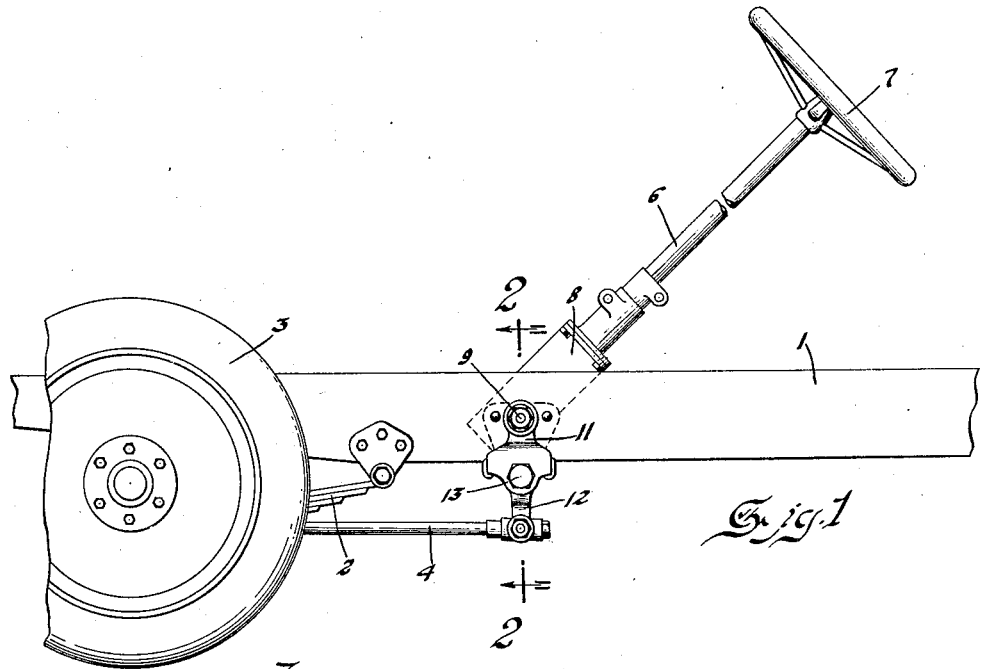
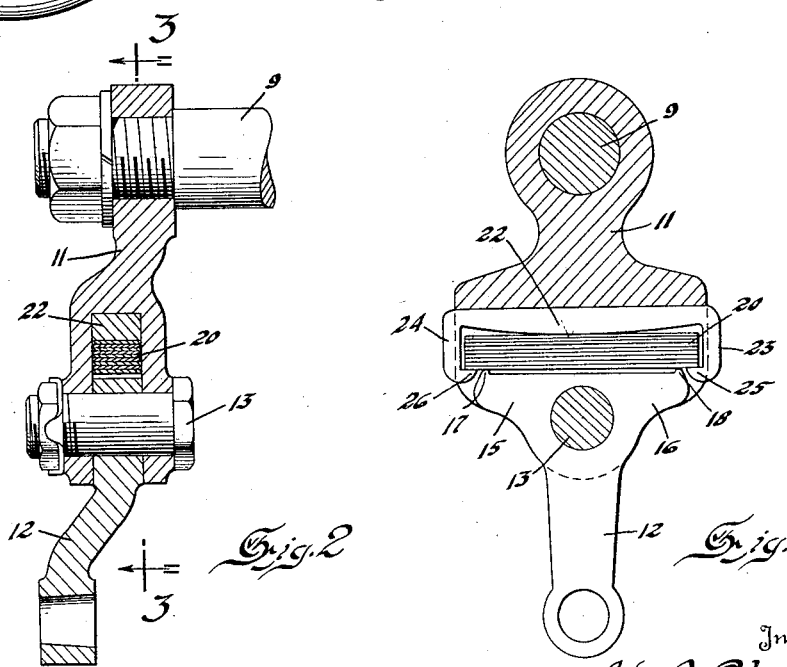
Inventors
John O. Almen &
Olaf Rasmussen
By Blackmore, Spencer & Fluh
Attorneys

UNITED STATES PATENT OFFICE

JOHN O. ALMEN, OF ROYAL OAK, AND OLAF RASMUSSEN, OF DETROIT, MICHIGAN, ASSIGNORS TO GENERAL MOTORS RESEARCH CORPORATION, OF DETROIT, MICHIGAN, A CORPORATION OF DELAWARE

STEERING ARM

Application filed October 2, 1929. Serial No. 396,734.

This invention relates to steering mechanism for motor vehicles and the like and particularly to an improved pitman arm for transmitting movement from the steering column to the steering linkage connected with the road wheels.

It is one of the objects of the present invention to provide an improved construction for damping and preventing the inception of front wheel wobble and shimmy, whereby wheel fight and its resultant harmful and disagreeable effects are eliminated and the driver is to a great extent relieved from shock, annoyance and tiring strains incident to guiding the vehicle and controlling its path of travel.

A further object is to provide an articulated steering arm comprising jointed sections yieldingly held against relative movement, wherein the resistance to relative movement damps out the tendency toward the generation of sharp, violent vibratory forces incident to wheel wobble, and at the same time eliminates looseness or play between the parts under normal conditions, to preclude the possibility of the car wandering on the road during travel and insure its direction of movement being under direct control at all times.

Additional objects and features of advantage will become apparent during the course of the following specification when taken in connection with the accompanying drawing wherein:

Fig. 1 is a fragmentary side elevation of a chassis frame with steering mechanism associated therewith in accordance with the present invention.

Fig. 2 is a transverse sectional view of the jointed pitman arm and is taken on line 2—2 of Fig. 1.

Fig. 3 is a sectional view taken on line 3—3 of Fig. 2.

Referring to the drawing, the reference numeral 1 indicates a chassis frame of a motor vehicle which is to be supported through suitable springs, such as 2, upon front and rear axles. The front axle is provided at opposite ends with pivoted spindles on each of which is rotatably mounted a road wheel 3, the spindles being inter-connected for unison swinging movement by conventional linkage, of which the drag bar 4 forms a part.

Mounted on the frame and extending upwardly therefrom is a steering column assembly 6 having at one end the hand wheel 7 and at its opposite end a gear box 8 from which projects laterally a rock shaft 9. To transmit the movement from the rock shaft to the drag link 4, there is provided a swinging pitman arm or lever which, in the present case, preferably consists of jointed sections 11 and 12 respectively. The section 11 is keyed, splined or otherwise secured at one end on the rock shaft 9 and is preferably provided at its opposite end with a pair of forks between which is received and pivoted for swinging movement upon the connecting bolt or stud 13, the upper end of the section 12, the lower end of which is suitably connected with the drag bar 4.

Adjacent its connection with the section 11, the section 12 is provided with a pair of ears or legs 15 and 16, projecting laterally on either side of the pivotal axis of the pin 13 and terminating in beads or bosses 17 and 18 respectively for contact at spaced apart points with the under side of a laminated spring element 20, which may consist of a series of superposed flat blades or leaves of spring metal, between succeeding spring leaves of which, if desired, may be interposed strips of fiber or other friction material for the purpose of increasing internal friction in the spring pack. This spring pack 20 is positioned in a carrier of substantially U-shape, fixed relative to the pitman arm section 11 and comprised of a connecting portion 22 having a convex inner surface for engagement with the top side of the spring pack intermediate its ends, and a pair of dependent legs or arms 23 and 24 having inturned ears or shoulders 25 and 26 respectively, for abutment with the opposite ends of the spring pack on the side opposite that engaged by the convex surface.

Normally, the parts are maintained in the position illustrated in Fig. 3. When the steering wheel 7 is turned in the hands of the car driver, the pitman arm parts are swung bodily with the rock shaft 9 to push or pull on the drag bar 4. In the event, there occurs a tendency for the front wheel spindles to move violently back and forth because of driving or other conditions, the drag bar 4 transmits the force and tends to swing the pitman arm section 12 about its pivot 13. Assuming first that the section 12 has a tendency to move toward the right in Fig. 3, the abutment portion 18 will contact with the adjacent portion of the spring pack 20 bending the series of spring leaves about the curved or convex surface of the connecting member 22 and lifting the adjacent end of the spring pack off its abutment shoulder 25 while the opposite end of the spring pack rests against and is held by the abutment 26 as the contact point 17 moves away from the spring. Upon movement of the section 12 toward the left beyond neutral position of the parts, the contact 17 will, in a similar fashion, lift the adjacent end of the spring pack free of the shoulder 26 to flex the leaves on the convex surface of the member 22 while the contact 18 moves away from the opposite end of the pack which is then resting on the shoulder 25. Thus, the spring is stopped from following up the movement beyond neutral position and the full value of spring resistance is available to resist relative movement in either direction of the two sections 11 and 12.

The inherent resistance of the spring leaves to bending serves to normally maintain the parts in centered position and prevents uncontrolled wheel spindle turning movement and wandering of the car on the road while this inherent spring resistance, together with inter-leaf friction, damps the violent forces incident to wheel wobble. Use of fiber or friction strips between the spring leaves may or may not be made, depending upon the amount of frictional resistance desired.

It will be readily understood that the convex surface of the member 22 serves to vary the deflection characteristics of the spring pack, since the spring bends around and against the convex surface upon its deflection and its contact with the curved surface varies and moves from the center outward toward the spring end. Therefore, the length of the spring that is free to flex constantly decreases as the flexure increases, and the shorter the part to flex the greater the resistance. Thus the rate of spring increases with the load; the change in pressure of the spring per unit of movement being greater for high loads that for low loads. The proper curvature of the convex surface to be provided will be dependent more or less upon conditions of use and may be predetermined in accordance with resistance required for any particular case.

Various modifications of the preferred embodiment before described may be made as will be apparent to those skilled in the art.

We claim:

1. In a device of the character described, a pair of members jointed together for relative movement, a spring element interposed between co-operating portions of the two members, the portions of one member being spaced apart and located on opposite sides of the joint axis and the portions of the other member being located intermediate and beyond the first portions, whereby movement about said axis flexes the spring element between one of the portions of the first member and the portions of the second member beyond the other portion of the first member and intermediate the portions of the first member, and is thereby yieldingly resisted.

2. In a device of the character described, a pair of members jointed together for relative movement, a spring element interposed between co-operating portions of the two members, and bearing at one side at an intermediate point and at the opposite side adjacent its ends on one of the members, and adapted for engagement on the last mentioned side at points on either side of the joint axis by parts of the other member and to be flexed upon relative movement whereby to resist such movement.

3. In a device of the character described, two members movable relative to each other, a spring element interposed between co-operating portions of the members, and bearing on one of the members adjacent its opposite ends and at an intermediate point, and adapted to be engaged by the other member upon relative movement and to be sprung between the members to yieldingly resist such movement.

4. In a device of the character described two members movable relative to each other a spring element interposed between co-operating portions of the members, and engaging with one of the members at opposite ends and at an intermediate point, and adapted for engagement by the other member adjacent the opposite ends and to be sprung between two of its points of engagement with the first mentioned member to yieldingly resist relative movement of the members.

5. Anti-shimmy means in the steering mechanism of a motor vehicle, including an articulated pitman arm, a leaf spring between the jointed sections, one of the sections having an abutment for an intermediate portion of the spring leaf at one side thereof and a pair of spaced abutments for portions adjacent opposite ends of the spring leaf at the opposite side, and the other section having a pair of spaced contacts for engagement with the spring leaf on the side last mentioned and adjacent its ends.

6. An articulated pitman arm for steering gear of a vehicle, including a pair of jointed sections, a flat spring leaf adapted to resist relative movement of the sections, a convex member associated with one of the sections for contact with one side of the spring leaf, a pair of abutments engageable with the opposite side of the spring leaf adjacent its opposite ends, and a pair of contacts on the other section on opposite sides of the joint axis for engagement with the spring leaf on the side last mentioned and adjacent its opposite ends, whereby upon relative movement one or the other contacts lifts the spring leaf off an adjacent abutment against its inherent resistance to binding strain.

7. An articulated pitman arm for steering gear of a vehicle or the like, including a pair of jointed sections, a spring element between the sections, abutments fixed relative to one section for contact with one side of the spring element intermediate its ends and with the other side of the spring element at opposite ends respectively, and a pair of spaced abutments on opposite sides of the joint axis, fixed relative to the other section for contact with the spring element side last mentioned whereby the spring element resists relative movement between the sections about the joint axis.

8. The structure of claim 7 wherein the spring element consists of a pack of spring blades.

9. The structure of claim 7 wherein the spring element consists of a pack of spring blades having friction material between successive blades.

10. The structure of claim 7 wherein the spring element consists of alternately arranged spring blades and blades of friction material.

11. The structure of claim 7 wherein the spring element consists of laminated leaves of spring metal and friction material.

12. Anti-shimmy means in the steering mechanism of a motor vehicle, including an articulated pitman arm, a leaf spring between the jointed sections to yieldingly resist relative movement thereof, one of the sections having a part engageable with one side of the spring adjacent one end and the other section having a part engageable with the same side of the spring but adjacent its opposite end, and also having a convex part engageable with the opposite side of the spring intermediate said ends, with a curved surface against which the spring progressively bends into contact upon its deflection between said parts as the sections move relative one another.

In testimony whereof we affix out signatures.

JOHN O. ALMEN.
OLAF RASMUSSEN.